United States Patent [19]

Casey

[11] Patent Number: 5,099,608

[45] Date of Patent: Mar. 31, 1992

[54] POTTED PLANT REMOVAL APPARATUS

[76] Inventor: Forrest R. Casey, 155 Wortman Ave., #6A, Brooklyn, N.Y. 11207

[21] Appl. No.: 527,851

[22] Filed: May 24, 1990

[51] Int. Cl.$^5$ .............................................. A01G 9/02
[52] U.S. Cl. ........................................... 47/73; 47/66
[58] Field of Search ................... 47/66, 73, 75, 78, 71, 47/67

[56] References Cited

U.S. PATENT DOCUMENTS

| | | | |
|---|---|---|---|
| D. 226,279 | 2/1973 | Eyerly | 47/73 |
| 637,763 | 11/1899 | Burke | 47/73 |
| 1,638,693 | 9/1926 | Hooks | 47/73 |
| 4,047,329 | 9/1977 | Holt | 47/71 |
| 4,223,480 | 9/1980 | Welty | 47/73 |

Primary Examiner—David A. Scherbel
Assistant Examiner—Michele A. Van Patten
Attorney, Agent, or Firm—Leon Gilden

[57] ABSTRACT

An apparatus in combination with a conically truncated pot, including spaced shells mounted within the pot underlying and in surrounding relationship relative to a soil core mounting a plant therewithin. The shells are defined by arcuate walls complementary to an interior surface of the pot and of a height substantially equal to an interior surface of the pot wall height. The shells each include a lower semi-annular rim to underlie the soil core, wherein the upper ends of the shells include rigid handles mounted to and directed exteriorly of the shells and the associated pot. The shells formed of a memory retentent flexible material are deformable upon downward rotation of the handles to separate the soil core and shells from the interior surface of the associated pot and to accordingly enable removal of the soil core by upwardly grasping the handles and removing the shells relative to the pot.

2 Claims, 4 Drawing Sheets

U.S. Patent    Mar. 31, 1992    Sheet 1 of 4    5,099,608
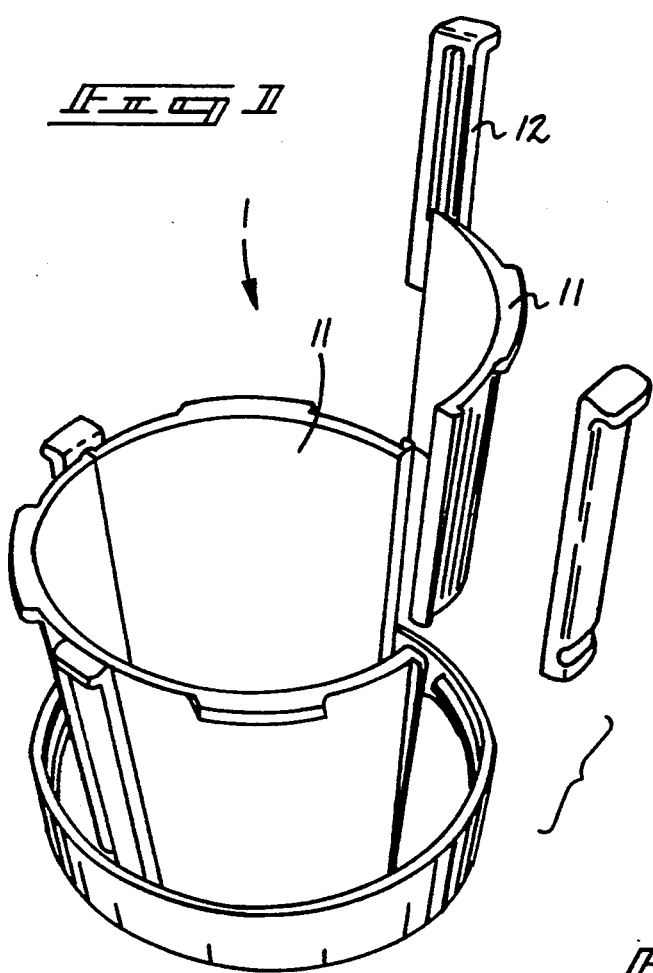
Fig 1
PRIOR ART
Fig 2
PRIOR ART
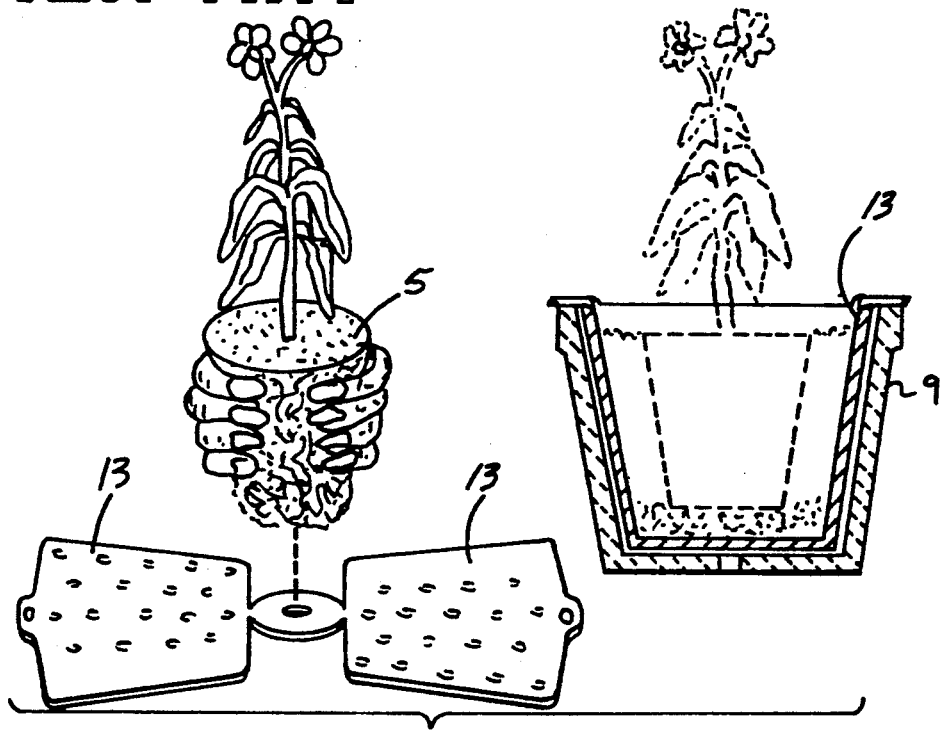

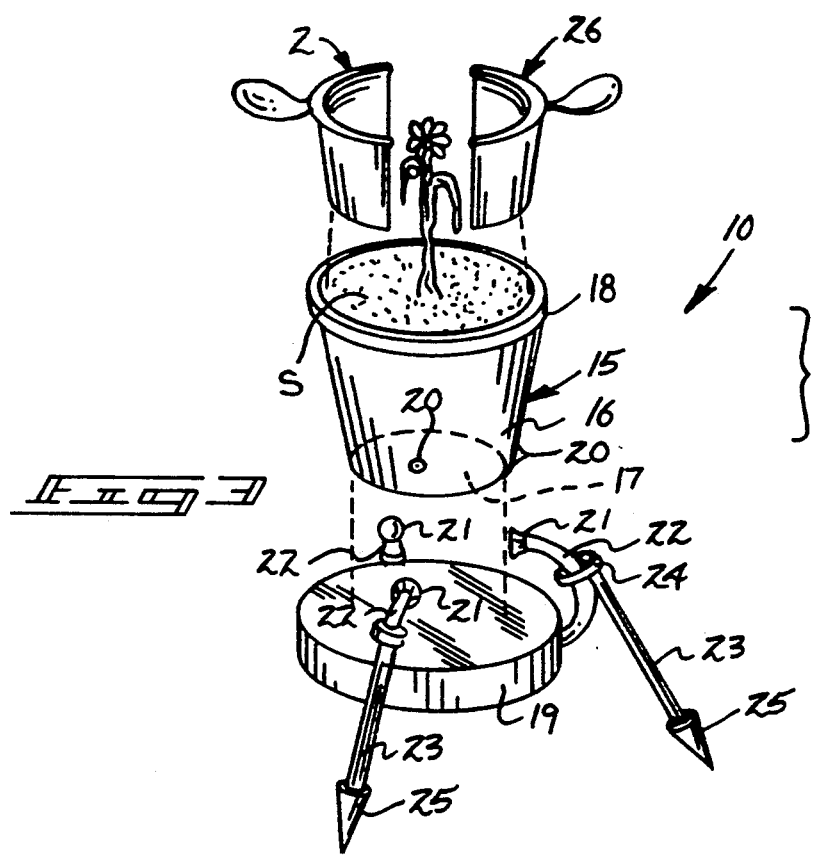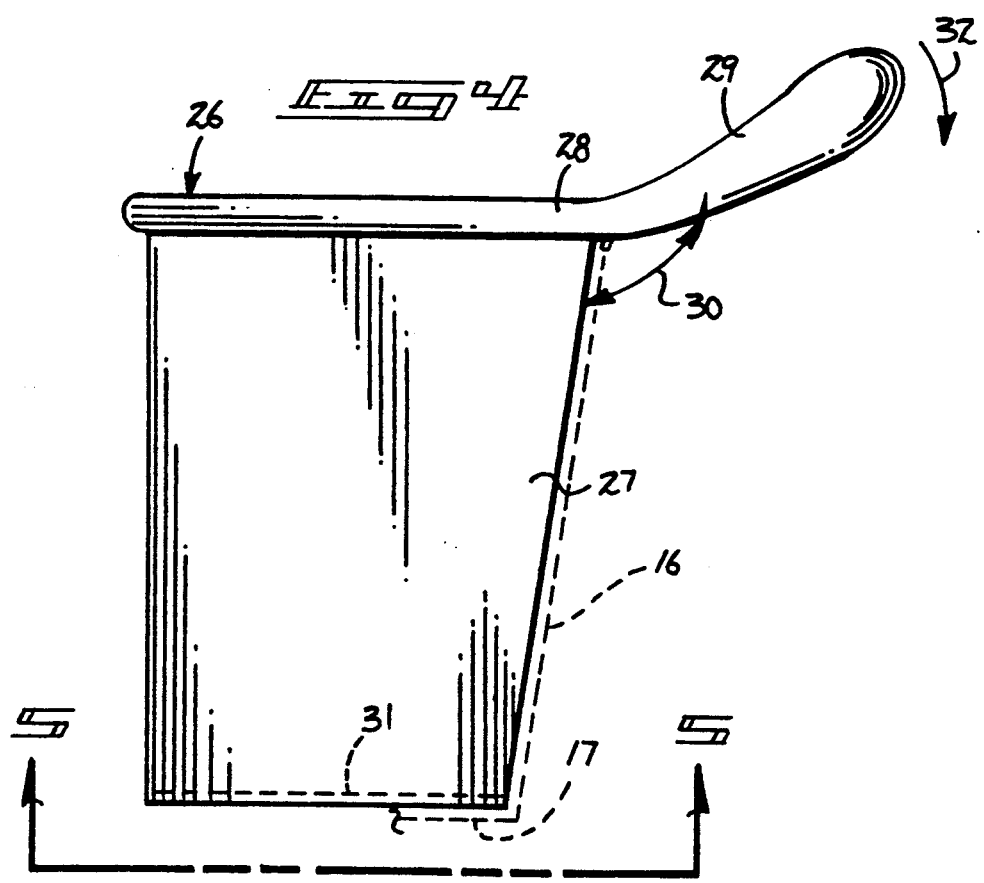

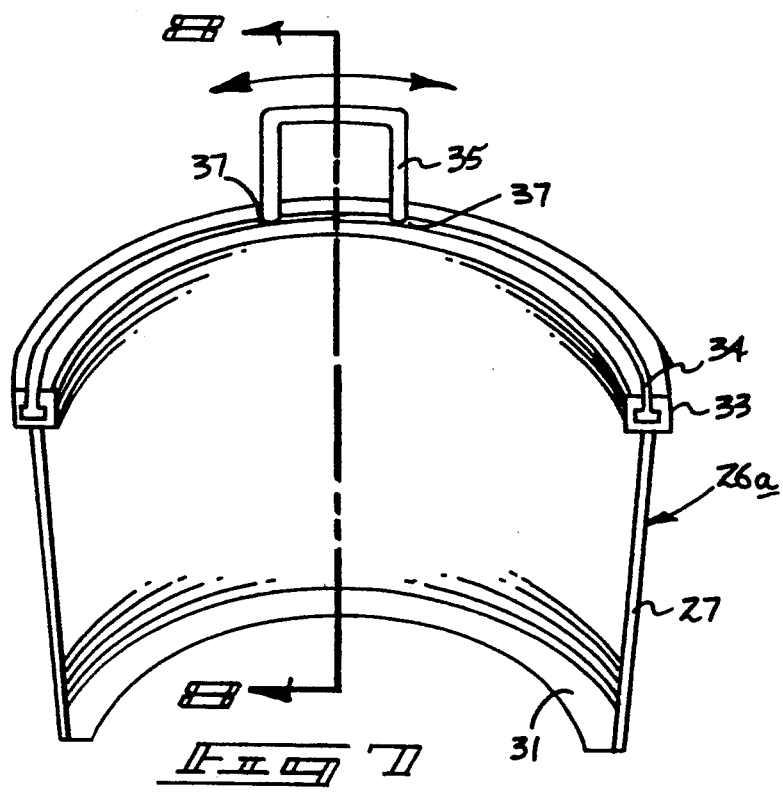
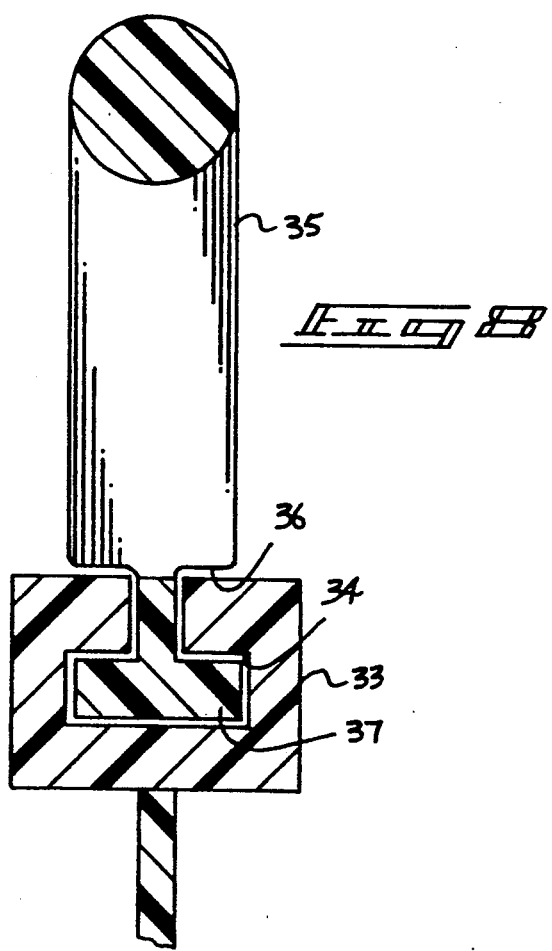

POTTED PLANT REMOVAL APPARATUS

BACKGROUND OF THE INVENTION

1. Field of the Invention

The field of invention relates to transplanting apparatus, and more particularly pertains to a new and improved potted plant removal apparatus wherein the same permits removal of a soil core and associated plant from a pot.

2. Description of the Prior Art

The need for removal of soil cores for an associated pot has been recognized by the prior art to permit ease of removal of such cores during a transplanting, or even in a discarding procedure, to dispose of undesirable soil cores. Prior art has included various structure to permit assembly of an associated pot for utilizing unitary inserts within a pot and the like for removal of such cores. These inserts and the like have drawbacks requiring utilization of extensive surface area portions of a pot inhibiting desirable drainage and the like therethrough. The instant invention attempts to overcome deficiencies of the prior art by minimizing volume required within an associated pot structure. Examples of the prior art include U.S. Pat. No. 4,325,202 to Liard wherein a knock-down plant pot is separable into components to permit freeing of an associated soil core therewithin.

U.S. Pat. No. 4,223,480 to Welty utilizes a liner for surroundingly encompassing a soil core upon being positioned within an associated pot to permit removal of the liner and associated soil core at a subsequent transplanting procedure.

U.S. Pat. No. 4,363,189 to O'Donnell sets forth a planter wherein the sides include clamps to secure the side walls together for subsequent removal of the enclosed soil core contained therewithin.

U.S. Pat. No. 4,628,634 to Anderson provides a nursery type container wherein an exterior cylinder secures an interior liner, wherein the liner is separable to permit removal of an associated soil core therewithin.

U.S. Pat. No. 4,442,628 to Whitcomb sets forth a root pruning container wherein a series of vertical staircase is stepped interiorly of the pot wherein root tips directed interiorly of the stepped portions result in termination of root growth due to an acute angle of turning required of a plant root directed therewithin.

As such, it may be appreciated that there continues to be a need for a new and improved potted plant removal apparatus wherein the same addresses both the problems of ease of use, as well as effectiveness in construction and in this respect, the present invention substantially fulfills this need.

SUMMARY OF THE INVENTION

In view of the foregoing disadvantages inherent in the known types of potted plant removal apparatus now present in the prior art, the present invention provides a potted plant removal apparatus wherein the same permits convenient and effective removal of a soil core relative to an associated pot structure. As such, the general purpose of the present invention, which will be described subsequently in greater detail, is to provide a new and improved potted plant removal apparatus which has all the advantages of the prior art potted plant removal apparatus and none of the disadvantages.

To attain this, the present invention provides an apparatus in combination with a conically truncated pot, including spaced shells mounted within the pot underlying and in surrounding relationship relative to a soil core mounting a plant therewithin. The shells are defined by arcuate walls complementary to an interior surface of the pot and of a height substantially equal to an interior surface of the pot wall height. The shells each include a lower semi-annular rim to underlie the soil core, wherein the upper ends of the shells include rigid handles mounted to and directed exteriorly of the shells and the associated pot. The shells formed of a memory retentent flexible material are deformable upon downward rotation of the handles to separate the soil core and shells from the interior surface of the associated pot and to accordingly enable removal of the soil core by upwardly grasping the handles and removing the shells relative to the pot.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved potted plant removal apparatus which has all the advantages of the prior art potted plant removal apparatus and none of the disadvantages.

It is another object of the present invention to provide a new and improved potted plant removal apparatus which may be easily and efficiently manufactured and marketed.

It is a further object of the present invention to provide a new and improved potted plant removal apparatus which is of a durable and reliable construction.

An even further object of the present invention is to provide a new and improved potted plant removal apparatus which is susceptible of a low cost of manufacture with regard to both materials and labor, and which accordingly is then susceptible of low prices of sale to the consuming public, thereby making such potted plant removal apparatus economically available to the buying public.

Still yet another object of the present invention is to provide a new and improved potted plant removal apparatus which provides in the apparatuses and methods of the prior art some of the advantages thereof, while simultaneously overcoming some of the disadvantages normally associated therewith.

Still another object of the present invention is to provide a new and improved potted plant removal apparatus wherein the same permits introduction of shells between a soil core and associated interior surface of a pot to permit convenient removal of the associated soil core therefrom by flexure of associated handles mounted respectively to each shell of the removal apparatus.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of a prior art knockdown plant structure.

FIG. 2 is an isometric illustration of a prior art potted plant removal apparatus.

FIG. 3 is an isometric exploded illustration of the instant invention.

FIG. 4 is an orthographic side view taken in elevation of a shell of a pair of shells utilized by the instant invention.

FIG. 7 is an isometric illustration of a modified shell structure of the instant invention.

FIG. 8 is an orthographic view, taken along the lines 8—8 of FIG. 7, in the direction indicated by the arrows.

DESCRIPTION OF THE PREFERRED EMBODIMENT

Figure 5:
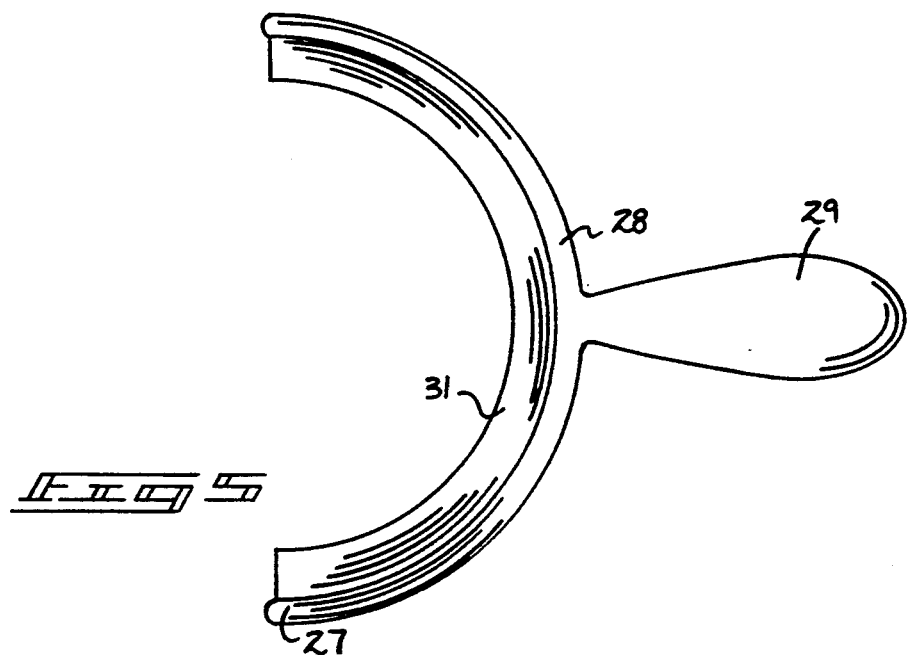
FIG. 5 is a top orthographic view of a shell of the pair of shells utilized by the instant invention.

With reference now to the drawings, and in particular to FIGS. 1 to 8 thereof, a new and improved potted plant removal apparatus embodying the principles and concepts of the present invention and generally designated by the reference numeral 10 will be described.

FIG. 1 illustrate a prior art knock-down plant apparatus 1 wherein wall segments 11 of the pot are secured together by clip members 12 to secure the wall segments together. FIG. 2, in another approach, utilizes plate members 13 joined together by a central annular segment to secure the associated soil core "S" in a surrounding relationship within an associated pot 9.

More specifically, the potted plant removal apparatus 10 of the instant invention essentially comprises a pot 15 defined by an inverted truncated conical wall 16, including an interior surface spaced from an exterior surface. The wall 16 is mounted orthogonally to a coaxially aligned annular base 17, wherein the wall, at its uppermost edge, includes an annular surrounding rim 18. The wall 16 includes a series of conical projections 20 extending exteriorly therefrom adjacent the annular base 17 spaced apart at 120 degree intervals adjacent the base 19. A cylindrical support base 19 includes a series of conical cups 21 mounted upon arcuate arms 22 spaced apart at 120 degree intervals, wherein the arcuate arms are mounted integrally to the cylindrical side wall of the support base 19, and wherein the arms 22 are of a generally resilient construction to bias the conical cups 21 interiorly towards a common central axis of the support base 19. Spike rods 23 include cylindrical rings 24 surrounding each of the arcuate arms 22, whereupon directing of the spike rods 23 and their associated anchor heads 25 downwardly, tension upon the arcuate arms 22 is adjusted to accommodate various tension and clamping force directed onto the conical projections 20. Understandably, the degree of force directed onto the arms 22 by the rods 23 determines the clamping force of the cup 21 upon the projections 20.

A plurality of shells 26 are mounted within the pot 16 and are defined by a semi-truncated conical configuration complementary to the interior surface of the wall 16 of the pot 15. The shells are of a flexible construction formed of memory retentent material, and include a semi-annular flange 31 directed orthogonally relative to an axis defined by each of the shells 26. The shells 26 include the walls 27 defining a height substantially equal to an interior height of the interior surface of the wall 16. The walls 27 include a rigid semi-annular rim 28, with each of the rims 28 of each of the shells 26 including a rigid handle 29 directed outwardly thereof defining an obtuse included angle between the handles 29 and an exterior surface of the shell walls 27. When the shells 26 are mounted within the pot structure 15, downward flexure of the handles 29 in the direction of the arrows 32 flex the walls 27 and thereby break the associated soil core "S" free from the pot 15.

Figure 6:
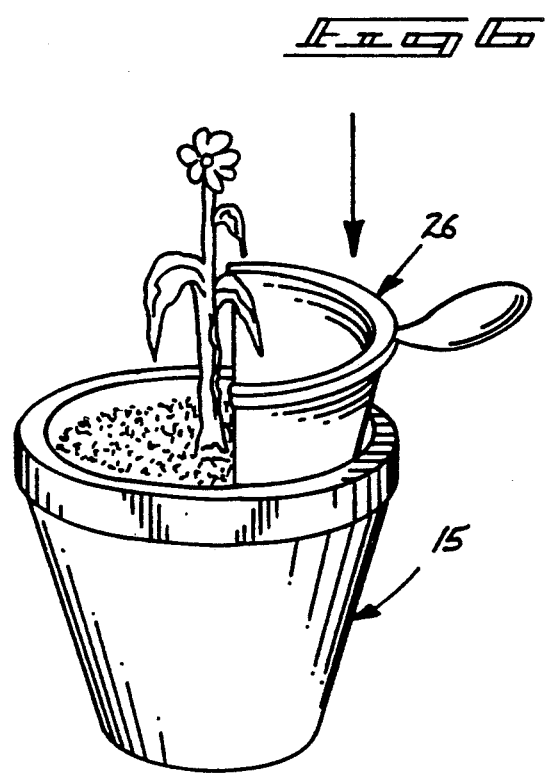
FIG. 6 is an isometric illustration illustrating an insertion of a shell of the pair of shells within a pot in surrounding relationship to a soil core.

FIG. 6 illustrate the use of the shells 26 inserted into a pot subsequently to a soil core "S" secured within the pot 15. The semi-annnular flanges 31 are of a length to permit the shells 26 to be inserted within the pot 15, if deemed necessary.

FIGS. 7 and 8 illustrate a modified shell structure 26a including the shell wall 27 of dimensions as noted above, and the associated semi-annular flange 31. The rigid semi-annular rim 33 includes a "T" shaped slot 34 coextensively formed therethrough to slidingly receive the "T" shaped flange 37 formed integrally to each lower terminal end 36 of each leg of the "U" shaped handle 35. In this manner, the handles 35 may be repositioned relative to the modified shell structure 26a and subsequently deflected downwardly to permit flexure of the walls 27 of each shell relative to the pot structure 15.

It is contemplated that development of the instant invention may include improvements incorporating microcircuitry and miniaturized motor development permitting electronic actuation of various components such as extensible side wall structure of the shells 26, as well as extension of the flanges 31 to permit underlying securement and mounting of the soil core "S" upon the structure. Further, handle clamps may be utilized subsequently to secure and lift the associated structure from the associated pot. Further, various height adjustment motorized actuation of the device may be developed to provide an adjustable structure accommodating a variety of pots and minimizing need for physical and manual manipulation of the structure as provided by the invention as described above.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A potted plant removal apparatus comprising, in combination,
   a pot defined by an inverted truncated conical wall, the conical wall including an interior conical wall surface and an exterior conical wall surface, and
   the conical wall including an integral annular base coaxially formed integrally relative to the conical wall at a lowermost terminal end thereof, and
   an annular rim mounted to an upper terminal end of the truncated conical wall, and
   a support base, and
   securement means cooperative with projections mounted to the exterior surface of the conical wall for securement of the pot to an underlying cylindrical support base, and
   the pot including a plurality of shell members positioned adjacent the interior surface of the truncated conical wall of the pot to secure a soil core within the shell members, and
   wherein the truncated conical wall is defined by a predetermined height, and each of the shell members is defined by a height equal to the predetermined height, and each of the shell members is defined by a semi-annular truncated arcuate wall of a complementary configuration to the interior surface of the truncated conical wall of the pot, and each shell member includes a semi-annular flange integrally mounted orthogonally relative to an axis defined by each shell member, and
   wherein each shell member includes a rigid semi-annular rim formed to an upper terminal end of each wall of each shell member, and each semi-annular rigid rim including a rigid handle mounted thereto, and
   wherein each wall of each shell member is formed of a semi-rigid flexible material of memory retentent structure, and
   wherein each semi-annular rigid rim of each shell member includes a coextensive "T" shaped slot formed therewithin, and each handle is slidably mounted within each "T" shaped slot.

2. An apparatus as set forth in claim 1 wherein each handle is of a "U" shaped configuration and includes a lower terminal end, and each lower terminal end includes a "T" shaped flange slidably received within "T" shaped slot of each shell member.

* * * * *